United States Patent
Hansen

(10) Patent No.: US 6,203,405 B1
(45) Date of Patent: Mar. 20, 2001

(54) METHOD FOR USING RECYCLED ALUMINUM OXIDE CERAMICS IN INDUSTRIAL APPLICATIONS

(75) Inventor: Richard W. Hansen, Eagle, ID (US)

(73) Assignee: Idaho Powder Products, LLC, ID (US)

( * ) Notice: Subject to any disclaimer, the term of this patent is extended or adjusted under 35 U.S.C. 154(b) by 0 days.

(21) Appl. No.: 09/346,065

(22) Filed: Jul. 1, 1999

Related U.S. Application Data

(60) Provisional application No. 60/091,370, filed on Jul. 1, 1998.

(51) Int. Cl.⁷ .................................................. B24B 1/00
(52) U.S. Cl. ................................................ 451/38; 451/40
(58) Field of Search ................................ 451/38, 39, 40, 451/54

(56) References Cited

U.S. PATENT DOCUMENTS

| | | |
|---|---|---|
| Re. 30,778 | 10/1981 | Hahn et al. . |
| Re. 31,128 | 1/1983 | Walker et al. . |
| 3,658,259 | 4/1972 | Ledergerber . |
| 3,876,156 | 4/1975 | Muschekknautz et al. . |
| 3,897,010 | 7/1975 | Weishaupt et al. . |
| 4,059,231 | 11/1977 | Neu . |
| 4,219,164 | 8/1980 | Taylor . |
| 4,390,131 | 6/1983 | Pickerl . |
| 4,611,764 | 9/1986 | Harsanyi et al. . |
| 4,792,098 | 12/1988 | Haddow . |
| 4,798,027 | 1/1989 | Hamada . |
| 4,845,903 | 7/1989 | Woodward . |
| 4,923,124 | 5/1990 | Wiley . |
| 5,358,188 | 10/1994 | Makino et al. . |
| 5,421,524 | 6/1995 | Haddow . |
| 5,512,006 * | 4/1996 | Wood et al. ............................ 451/39 |
| 5,542,613 | 8/1996 | Nied . |
| 5,551,639 | 9/1996 | Artemjev et al. . |
| 5,643,057 * | 7/1997 | Isaacson ................................. 451/81 |
| 5,690,539 * | 11/1997 | Swidler et al. ........................ 451/38 |
| 5,785,579 * | 7/1998 | Grondin ................................. 451/38 |
| 5,951,372 * | 9/1999 | Choquette et al. .................... 451/38 |

\* cited by examiner

Primary Examiner—Joseph J. Hail, III
Assistant Examiner—Dung Van Nguyen
(74) Attorney, Agent, or Firm—Madson & Metcalf

(57) ABSTRACT

A method of sandblasting an article, such as in industrial cleaning and polishing, using recycled waste aluminum oxide ceramic particles is disclosed. In the method, a quantity of recycled ceramic aluminum oxide particles having a size ranging from about ¼ inch to about 400 mesh, depending upon the target and application, is obtained. For abrasive applications, the particle size is preferably from ¼ inch to 60 mesh. For polishing applications, the particle size is preferably from 80 to 400 mesh. The recycled ceramic particles are propelled at an article in a carrier stream, such as compressed gas. Known and novel sandblasting equipment can be used according to the present invention. The ceramic particles are preferably obtained by grinding waste aluminum oxide ceramic material, such as waste spark plugs, ceramic switches, liners, and fire bricks.

13 Claims, No Drawings

METHOD FOR USING RECYCLED ALUMINUM OXIDE CERAMICS IN INDUSTRIAL APPLICATIONS

RELATED PATENT APPLICATION

This invention claims the benefit of U.S. Provisional Patent Application Ser. No. 60/091,370, filed Jul. 1, 1998, entitled "Method for Using Recycled Ceramics in Industrial Cleaning Applications," which application is incorporated herein by reference.

FIELD OF THE INVENTION

The present invention relates to the use of recycled ground ceramics in industrial cleaning, sandblasting, and polishing applications.

BACKGROUND OF INVENTION

Sandblasting is commonly used to clean objects and surfaces in industrial applications, such as buildings, monuments, rock surfaces, machines, parts, and similar objects. In addition, the maintenance of some structures and parts often involves the regular cleaning of surfaces by sandblasting. Sandblasting is often faster and more economical than mechanical cleaning methods. Sandblasting works by throwing abrasive particles against the surface to be cleaned. As used herein, the term sandblasting includes techniques for propelling loose abrasive materials, as described below, for various cleaning, polishing, or roughening applications.

Known loose abrasives include aluminum oxide, silicon carbide, corn cob granules, walnut shells, plastic media, steel media, glass beads, and ground cullet. Aluminum oxide and silicon carbide abrasives are very hard materials, typically measuring between 9 and 9.5 on the MOHS scale. These materials are specially manufactured for their use as loose abrasives. Corn cob granules, walnut shells, and plastic media are much softer abrasives, measuring between 3 and 4.5 on the MOHS scale. The softer abrasives are useful in cleaning and polishing surfaces without damaging the substrate.

With the exception of corn cob granules, walnut shells and ground cullet, loose abrasive materials used in sandblasting and industrial cleaning applications are specially manufactured beads. For instance, glass beads function well, but they are not durable and tend to disintegrate into dust after two or three passes through the sandblasting apparatus. The specially manufactured bead products tend to be costly.

It would be a significant advancement in the art to provide a particulate material, suitable for sandblasting or industrial cleaning applications, which is effective, durable, and low cost. It would also be an advancement to provide a method of using such material in sandblasting or industrial cleaning applications.

Such particulate material and methods are disclosed herein.

DESCRIPTION OF THE INVENTION

The present invention is directed to the use of ground or crushed recycled aluminum oxide ceramic material as a loose abrasive for use in sandblasting and industrial cleaning and polishing applications.

Aluminum oxide is a ceramic material formed through the fusion of alumina at temperatures above 2000° C. The material is very hard, typically measuring greater than 8.5, and preferably greater than 9, on the MOHS scale. Aluminum oxide is used in parts that must withstand high pressure and temperature and remain durable, such as in spark plugs, switches, insulators, liners, pumps, and fire bricks. Although the unique properties of aluminum oxide ceramic material render it suitable for use in a variety of applications, disposal of aluminum oxide ceramic material following its intended use presents some significant problems. Indeed, nearly all waste aluminum oxide ceramic material is sent to landfills because there are not good mechanisms for recycling aluminum oxide ceramic material. As environmental efforts to promote recycling increase, the amount of ceramic which is recovered from the solid waste stream will also continue to increase. One factor limiting the amount of recycling which is done is the lack of effective and convenient recycling opportunities in many areas.

The present invention relates to a new use of recycled ground ceramic material. As explained below, the recycled ground ceramic material used in sandblasting and industrial cleaning applications performs much better than specially manufactured beads. Because recycled aluminum oxide ceramic particles can be prepared at a lower cost than specially manufactured abrasive particles, the recycled ceramic material within the scope of the present invention represents a significant advancement in the art.

Recycled aluminum oxide ceramic material suitable for use in sandblasting and industrial cleaning and polishing applications can be obtained by grinding waste aluminum ceramic material, such as spark plug ceramic, ceramic switches, liners, and fire bricks, in a grinding and crushing apparatus. Examples of suitable grinding or comminuting devices are described in WO 96/23587 entitled "Methods for Recycling Glass and Uses of Recycled Glass" and in U.S. Pat. No. 5,887,804 entitled "Apparatus for Comminuting Glass", which are incorporated herein by reference.

The disclosed method quickly and inexpensively converts waste ceramic material into a form which can be used in sandblasting and industrial cleaning and polishing applications. The process involves "suspended attrition" in which the ceramic particles are suspended by rotating hammers and are caused to roll within a suspension chamber defined by the rotating hammers and by an adjustable plate. Unlike glass, which forms uneven, rounded edges under action suspended attrition, aluminum oxide materials are so hard that the edges do not round easily. Thus, the recycled ceramic particles have angular edges.

Recycled aluminum oxide ceramic particles can be obtained using other known and novel methods, including glass and rock grinding mills. One method that is particularly useful in preparing recycled aluminum oxide is to crush large pieces of waste aluminum oxide in a conventional jaw crusher. This produces particles of approximately ⅛ to ¼ size. These particles are then propelled through a venturi at high velocity at an aluminum oxide target. This produces smaller sized particles which can be screened and sorted by size.

By using multiple mesh screens of various sizes, ground recycled aluminum oxide ceramic material can be provided with a specific size or size range, typically ranging from about ¼ inch to about 400 mesh. Larger mesh particles, such as ¼ inch to 40 mesh material, are used in applications which require more abrasive or cleaning activity. Finer mesh particles, such as 80 to 400 mesh material, can be used in polishing or less abrasive applications.

A quantity of recycled, ground ceramic particles was obtained by passing waste spark plug ceramic material through a comminution apparatus, such as that described in U.S. Pat. No. 5,887,804. The resulting ceramic particles had an typical particle size of about 20 to 60 mesh. The recycled ceramic material was used in a machine shop to clean cast iron and aluminum engine components. It was observed that the recycled ceramic material cut faster and cleaned better than any glass beading product ever used in the machine shop. The recycled ceramic particles also operated at a lower air pressure than any cleaning particle previously used at the shop.

The industrial cleaning device used an initial starting load of the recycled aluminum oxide ceramic particles. After one week of heavy use, the sandblasting apparatus was emptied and the particles were recycled to remove fine particles and other debris that was removed during the cleaning process. After recycling, it was observed that very little of the original load of ceramic particles was lost. The ceramic particles were subjected again to another week of heavy use. It was observed that the ceramic particles still cleaned very well with no noticeable change in performance.

It is presently believed that the recycled aluminum oxide particles can be used at lower air pressure in conventional sandblasting equipment because they have sharper, more durable edges. For instance, while a typical sandblasting device may operate at a pressure of 80 psi using a conventional glass bead abrasive material, the recycled aluminum oxide particles can be used in the same device at a pressure of about 30 psi and provide better results. People having skill in the art will appreciate that the operating pressure can be adjusted depending upon the abrasive particle being used, the target surface, and the intended application.

Another important advantage of the recycled aluminum oxide particles used in the present invention is that no silica is entrained in the particles. Entrained silica can be a respiratory safety problem, particularly with silica sand, garnet, and zircon beads as the loose abrasive.

The recycled aluminum oxide ceramic particles can be used in a variety of industrial applications. For example, they can be effectively used in industrial cleaning applications. They can be used in lapping and polishing applications. They can be used in etching and engraving applications with glass, stone, metal, wood, and plastic. They can be used in refinishing of all materials. They can be used to prepare non-slip surfaces.

The recycled aluminum oxide particles can also be used in certain filler and reinforcement applications. For instance, because of its high strength and hardness, larger recycled aluminum oxide particles can be used as a filler or aggregate in concrete. Smaller aluminum oxide particles can be used as a filler in plastics, particularly plastic parts intended for high temperature applications. The recycled aluminum oxide can also be used as a filler in paints, tile grout, cleansers, and polishing agents. Paint containing recycled aluminum oxide possesses improved heat and fire resistance.

Non-skid surfaces and floors can be prepared by incorporating small recycled aluminum oxide particles in an epoxy, enamel or other suitable polymeric coating material which is then sprayed or rolled onto floors or other surfaces to make them non-skid. In a particularly convenient embodiment, the polymeric coating material and recycled aluminum oxide particles are incorporated into an aerosol spray system, like an aerosol paint can.

The recycled aluminum oxide particles can be used in high temperature metal casting. Conventional casting sand melts at high temperatures, whereas aluminum oxide particles withstand high casting temperatures. Because of its hardness and durability, the recycled aluminum oxide particles can effectively clean hard metal surfaces such at titanium used in the manufacture of golf club heads.

Because of its hardness and durability, the recycled aluminum oxide particles can be combined with water and used as an effective cutting medium with a wire saw in conventional stone cutting equipment.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

What is claimed is:

1. A method of sandblasting a surface comprising:

obtaining a quantity of comminuted aluminum oxide ceramic particles prepared by reducing waste aluminum oxide ceramic material into said particles, having a hardness greater than about 8.5 on the MOHS scale and a size smaller than about ¼ inch; and propelling a stream of the aluminum oxide ceramic particles at the surface.

2. A method of sandblasting a surface according to claim 1, wherein the aluminum oxide ceramic particles have a size in the range from about ¼ inch to about 60 mesh for abrasive applications.

3. A method of sandblasting a surface according to claim 1, wherein the aluminum oxide ceramic particles have a size in the range from about 80 to 400 mesh for polishing applications.

4. A method of sandblasting a surface according to claim 1, wherein the aluminum oxide ceramic particles are obtained by grinding waste aluminum oxide ceramic material.

5. A method of sandblasting a surface according to claim 1, wherein the aluminum oxide ceramic material is selected from waste spark plug ceramics, waste ceramic insulators, waste ceramic liners, and waste ceramic fire bricks.

6. A method of sandblasting a surface according to claim 1, wherein the aluminum oxide ceramic particles are obtained by crushing waste aluminum oxide ceramic material.

7. A method of preparing a non-skid surface comprising the steps of:

obtaining a surface coating material incorporating therein a quantity of comminuted aluminum oxide ceramic particles prepared by reducing waste aluminum oxide ceramic material into said particles;

applying the coating material to a surface; and allowing the coating material to cure and form a non-skid surface.

8. A method of preparing a non-skid surface according to claim 7, wherein the coating material is applied to the surface by spraying.

9. A method of preparing a non-skid surface according to claim 7, wherein the surface coating material and aluminum oxide ceramic particles are incorporated into an aerosol spray system.

10. A method of preparing a non-skid surface according to claim 7, wherein the waste aluminum oxide ceramic material is selected from waste spark plug ceramics, waste ceramic insulators, waste ceramic liners, and waste ceramic fire bricks.

11. A method of polishing a surface comprising the steps of:

obtaining a polishing agent comprising comminuted aluminum oxide ceramic particles and a carrier fluid, wherein said particles are prepared by reducing waste aluminum oxide ceramic material into said particles, and wherein said particles have a size less than 100 mesh; and polishing the surface with the polishing agent.

12. A method of polishing a surface according to claim 11, wherein the aluminum oxide particles have a size in the range from about 200 to 400 mesh.

13. A method of polishing a surface according to claim 11, wherein the waste aluminum oxide ceramic material is selected from waste spark plug ceramics, waste ceramic insulators, waste ceramic liners, and waste ceramic fire bricks.

* * * * *